May 6, 1941.  W. A. MEIGHAN  2,240,510
LOGGING CHOKER AND FITTING THEREFOR
Filed March 1, 1939   2 Sheets-Sheet 1

Inventor:
William A. Meighan
by [signature]
Attorney.

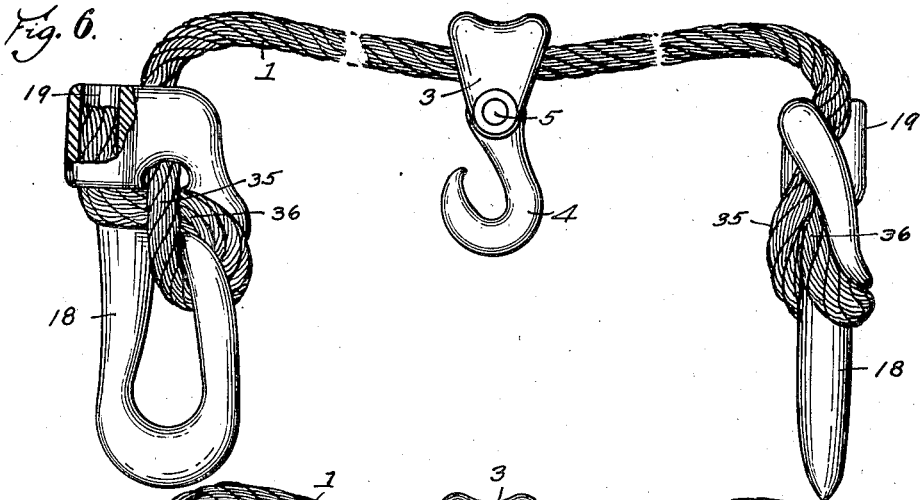
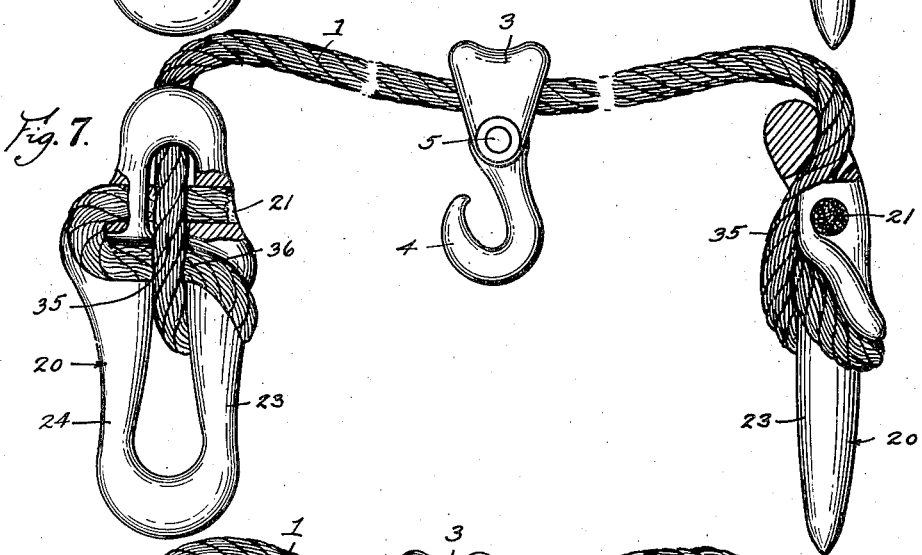
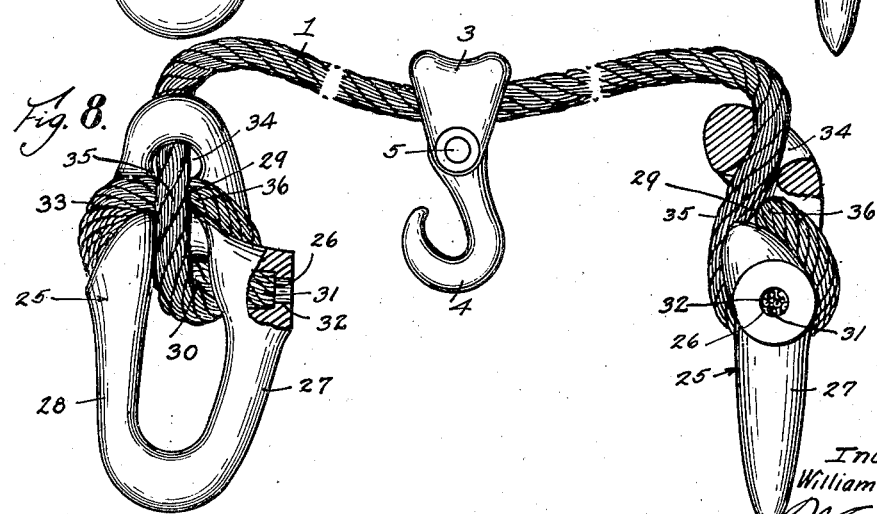

Patented May 6, 1941

2,240,510

UNITED STATES PATENT OFFICE 2,240,510

LOGGING CHOKER AND FITTING THEREFOR

William A. Meighan, Portland, Oreg.

Application March 1, 1939, Serial No. 259,187

8 Claims. (Cl. 294—74)

My invention relates to the logging and construction industries, and relates more particularly to those operations wherein steel cables, or lines, are frequently attached to and detached from logs or other objects to be pulled thereby.

An object of my invention is to provide a choker that can be inserted under logs more easily than any heretofore known. I attain this object by making the fittings on the ends of said choker flat. The openings between adjacent logs, or between a log and the ground or other obstacle, are inherently crack-like apertures much longer than they are wide. It follows that a flat fitting on the end of a choker can be thrust through such an opening that is too narrow to receive a round fitting of comparable strength. Furthermore, a flat fitting is useful in digging a passageway under a partially buried log.

A further object of my invention is to provide a choker that can be assembled without tools and without a blacksmith's forge or other heating device. I attain this object by providing fittings for the end of said choker about which the cable can be tightened by power. It is not possible to form a small, compact knot in a heavy steel cable by hand. Neither has it heretofore been possible to draw down a knot on a fitting suitable for chokers by power, this being a feat of considerable difficulty owing to the stiffness of the cable which makes it slip off the fitting instead of snubbing itself and binding thereon. The fittings herein described may be attached to a choker cable without tools or a heater much quicker than fittings heretofore used could be so attached in a blacksmith shop.

A further object of my invention is to provide a choker whose fittings are permanently attached thereto. It is not desirable that said fittings should be easily removable, since they would then work loose at inopportune times.

Further objects and details of my invention will be apparent from the following description thereof with reference to the accompanying drawings in which:

Fig. 6 is a foreshortened plan view of a choker embodying a modification of my invention looking at the side of the right hand fitting and at the front of the similar left hand fitting with a portion of the latter shown broken away to disclose the position of the end of the cable;

Fig. 7 is a similar view of a choker embodying a further modification of my invention wherein the left hand fitting is also shown broken away to disclose the position of the cable therein;

Fig. 8 is a view similar to Fig. 7 of a choker embodying a further modification of my invention.

Figure 1:
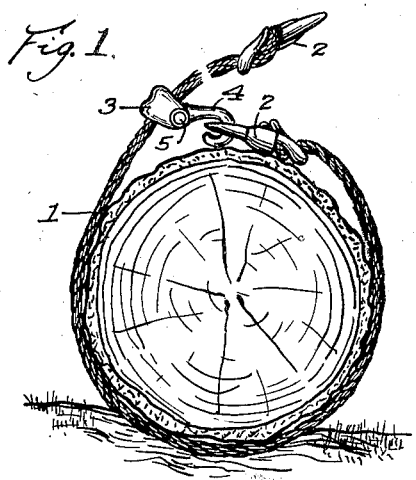
Fig. 1 is an end view of a log with a choker embodying my invention in place thereon.
Figure 2:
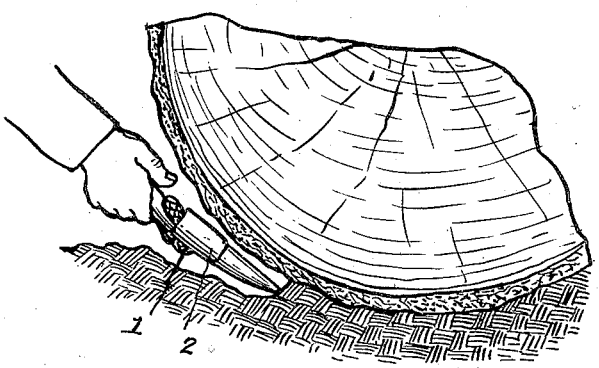
Fig. 2 is a view illustrating the manner in which a choker embodying my invention can be used to dig a passageway under a partially buried log.

A choker embodying my invention comprises a length of cable 1 to which are attached fittings 2, shown more clearly in Figs. 1 to 5. A slidable sleeve 3 carrying a hook 4 pivotally secured thereto by pin 5 is adapted to slide along said cable throughout its length but is prevented from coming off said cable by fittings 2 on either end thereof. Said sleeve is U-shaped in cross section with the portion thereof engaging the cable being rounded to avoid sharp bending of the latter. Pin 5 is adapted to pass through both sides of sleeve 3 and the eye of hook 4 therebetween, and to be held in said position by riveting both ends thereof.

Figure 3:
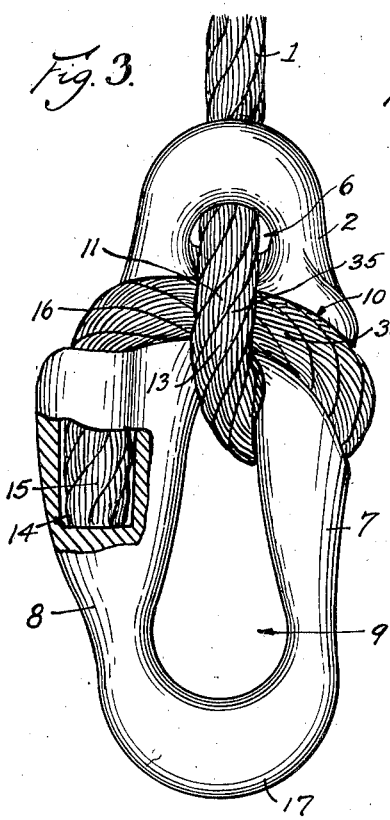
Fig. 3 is a front elevation of a fitting of a choker embodying my invention with a portion of the wall of the socket shown broken away to show the end of the cable therein.
Figure 4:
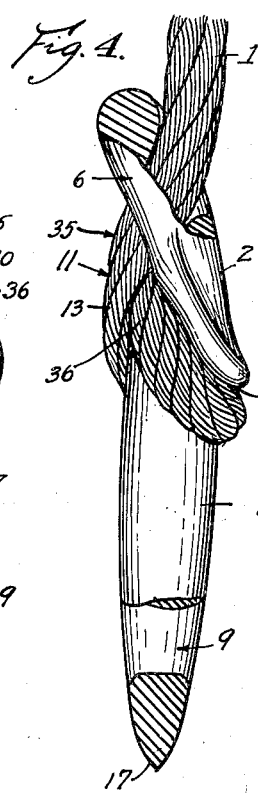
Fig. 4 is a side elevation of said fitting with a portion of the aperture shown broken away to show the gradual curvature of the cable at the point of greatest stress, and with a portion of the loop shown broken away to disclose the sharpened edge thereof.
Figure 5:
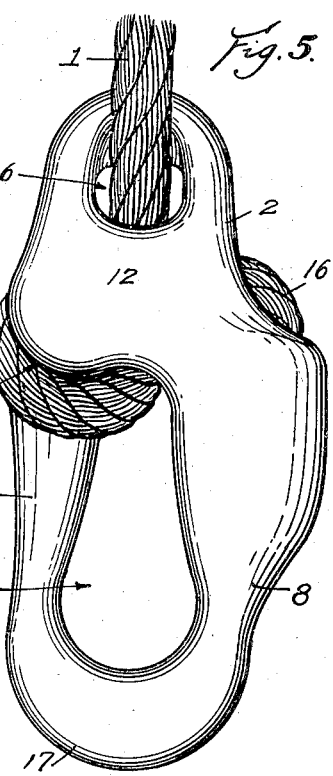
Fig. 5 is a back elevation of said fitting.

Fitting 2 comprises a flattened, elongated piece of steel having a transverse aperture 6 near one end thereof and two shanks 7 and 8 joined at either end to form a loop 9 adapted to engage either hook 4 or some other hook, toggle, or the like, to which it might be desired to attach the choker. I prefer to make said fitting of manganese steel, but it may be made of any suitable material. I have found manganese phosphor bronze to be particularly suitable for casting said fittings in the smaller sizes. Shank 7 is substantially encircled by a grooved way 10 adapted to position cable 1 as shown in Figs. 3, 4, and 5.

Cable 1 may be passed through aperture 6 thence around shank 7 along way 10 to form a complete loop intersecting itself at point 11. The portion of cable 35 adjacent aperture 6 is adapted to overlie and bind portion 36. I prefer to make grooved way 10 progressively deeper as it approaches point 11 so that cable 1 may be passed under itself at said point thereby binding or snubbing itself. I prefer that said groove continue across web 12, which lies between shanks 7 and 8, at sufficient depth that the cable therein will not be completely flattened by said snubbing, and that bight 13 be only sufficiently short to adequately accomplish said snubbing. I prefer not to snub said cable over a flat surface by a sharp bight lest said cable be weakened thereby.

Shank 8 is provided with a pocket 14 into which the end portion 15 of said cable may be inserted. Said pocket is arranged with respect to snubbing point 11 so that a sharp bend 16 is formed in the cable immediately adjacent said pocket. Due to the stiffness of a steel cable, bend 16 cannot be formed by hand. I prefer to insert end 15 into pocket 14 before cable 1 is drawn tight on the fitting. Bend 16 may then be formed loosely by hand, after which power may be applied to exert tension between said cable and loop 9 of said fitting. When said tension is first applied, that part of the cable on either side of aperture 6 acts as a lever with edge 17 of said aperture as a fulcrum thereby prying the underneath portion of cable firmly against the fitting to form bend 16. End portion 15 is thus held securely before tension is exerted thereon.

I have found it important to automatically hold end 15 securely when power is applied to draw down the cable to prevent said cable slipping off the fitting instead of forming a compact knot. To this end I initially arrange said cable so that said end will not be rotated during the drawing down process; that is, when said end is inserted in pocket 14 it is in the angular position it will finally occupy. I have observed that, whenever a closed loop is formed in a cable, said cable tends to twist one revolution, and, conversely, when a loop is removed from said cable it tends to untwist one revolution.

This tendency of a cable to twist when the number of its loops is changed is powerful and would cause end portion 15 to slip out of pocket 14 if it were allowed to occur. I, therefore, provide a fitting shaped to receive a cable in loose arrangement with the same number of loops, or fractions thereof, that it will have when drawn tight. In other words, I tighten a knot in a cable by reducing the size of the loops rather than by reducing their number.

Fitting 18, shown in Fig. 6, is similar to fitting 2 except that pocket 19 thereof is turned in the opposite direction. Fitting 20, shown in Fig. 7, is also similar to fitting 2 except that pocket 21 is turned at right angles to shanks 23 and 24, and it extends through both of said shanks.

Fitting 25, shown in Fig. 8, differs from fitting 2 in that pocket 26 is in the opposite shank from pocket 14 and the grooved way is so arranged that the cable is snubbed twice. Said way extends around shank 27, intersecting itself at point 29, continues around shank 28, intersecting itself a second time at point 30 at the entrance to pocket 26. End 31 of cable 1 is adapted to abut against shoulder 32 of pocket 26. In attaching said fitting to a cable, I prefer to arrange said cable loosely in place by hand and to form the sharp bend 33 by lever action of the cable in aperture 34. I find it advantageous to arrange the loosely formed knot so that the distance from the end of the cable to the point 29 is the same as in the final knot. Then, when the knot is drawn down, the upper cable at point 29 will slide over a stationary portion of the underneath cable and the latter will not tend to be misplaced before bend 33 is formed.

A choker embodying my invention may be assembled by attaching a fitting to one end of a short length of cable, as hereinbefore described. A sleeve and hook is then slipped on said cable and another fitting is attached to its free end, said fittings serving to hold said sleeve and hook in place. Said choker may then be placed around a log, or similar object, to be pulled and the loop of one fitting hooked on the sliding hook. The loop of the other fitting may be hooked on another hook on the end of a cable leading to a donkey engine, or other hoisting device, or it may be attached to the drawbar of a tractor, or other traction engine.

Because it is possible to attach the fittings herein described to a cable without tools and without heating means, and because said fittings are flat and may, therefore, be readily thrust under a log that is partially buried or that lies close against another log, said fittings are peculiarly adapted for use as choker fittings. However, it will be apparent that said fittings may be used for other purposes. They are adapted for use wherever it is desired to attach a wire cable to some object.

I claim:

1. A logging choker comprising a length of cable carrying terminal fittings bound to both ends thereof, each of said fittings comprising an integral structure defining an eye and fastening means for securing an end of said cable thereto, said fastening means including recessed portion into which the end portion of said cable can be laid to form a tight knot which permanently distorts the cable, said fastening means including a transverse aperture extending through said fitting for passing one end of said cable therethrough, and an encircling way for said cable communicating at its near end with said aperture and extending about a portion of said fitting to intersect itself adjacent said aperture, the portion of said fitting encircled by said way including a portion of the wall of said eye whereby a bight of a cable lying in said way will interlink said eye, said way intersecting itself at a point thereof common to said eye whereby a cable in said way may pass under itself to bind itself at said point common to said way and to said eye.

2. A fitting for a logging choker comprising a flat elongated integral member having an eye formed at one end and fastening means for securing the end of a cable at the other end thereof, said fastening means including a transverse aperture extending through said fitting for passing one end of said cable therethrough, an encircling way for said cable communicating at its near end with said aperture and extending about a portion of said fitting to intersect itself adjacent said aperture, said way being sufficiently deep adjacent its point of communication with said aperture that a portion of said cable adjacent its passage through said aperture is adapted to bind another portion thereof when said latter portion is positioned in said way under said first mentioned portion, and a pocket proportioned and arranged to house the end of said cable, said pocket being disposed across said way and opening thereinto between said eye and said aperture, whereby the end of said cable may be passed through said aperture, looped about said fitting, and drawn tight thereon by power.

3. A fitting for a logging choker comprising a flat elongated integral member having an eye formed at one end and fastening means for securing the end of a cable at the other end thereof, said fastening means including a transverse aperture extending through said fitting for passing one end of said cable therethrough, an encircling way for said cable communicating at its near end with said aperture and extending about a portion of said fitting to intersect itself adjacent said aperture, said way being sufficiently deep adjacent its point of communication with said aperture that a portion of said cable adjacent its passage through said aperture is adapted to bind another portion thereof when said latter portion is positioned in said way under said first mentioned portion, and a pocket proportioned and arranged to house the end of said cable, said pocket opening into said eye whereby the end of said cable may be passed through said aperture, looped about said fitting, and drawn tight thereon by power.

4. A fitting for a logging choker comprising a flat elongated integral member having an eye formed at one end and fastening means for securing the end of a cable at the other end thereof, said fastening means including a transverse aperture extending through said fitting for passing one end of said cable therethrough, an encircling way for said cable communicating at its near end with said aperture and extending about a portion of said fitting to intersect itself adjacent said aperture, said way being sufficiently deep adjacent its point of communication with said aperture that a portion of said cable adjacent its passage through said aperture is adapted to bind another portion thereof when said latter portion is positioned in said way under said first mentioned portion, and a pocket proportioned and arranged to house the end of said cable, said pocket opening into said eye, said pocket extending transversely of the inner end of said eye whereby the end of said cable may be passed through said aperture, looped about said fitting, and drawn tight thereon by power.

5. A logging choker comprising a length of cable and a fitting secured to one end thereof comprising a flat elongated integral member having an eye formed at one end and fastening means for securing the end of said cable at the other end thereof, said fastening means including a transverse aperture extending through said fitting for passing one end of said cable therethrough, an encircling way for said cable communicating at its near end with said aperture and extending about a portion of said fitting to intersect itself adjacent said aperture, said way forming a bight about one marginal edge of said eye, said way being sufficiently deep adjacent its point of communication with said aperture that a portion of said cable adjacent its passage through said aperture is adapted to bind another portion thereof when said latter portion is positioned in said way under said first mentioned portion, and a pocket proportioned and arranged to house the end of said cable, said pocket opening into said eye, the end of said cable adjacent said pocket lying within said bight whereby the end of said cable may be passed through said aperture, looped about said fitting, and drawn tight thereon by power.

6. A logging choker comprising a length of cable and a fitting secured to one end thereof comprising a flat elongated integral member having an eye formed at one end and fastening means for securing the end of said cable at the other end thereof, said member being of a thickness approximating double the thickness of said cable, said fastening means including a transverse aperture extending through said fitting for passing one end of said cable therethrough, an encircling way for said cable communicating at its near end with said aperture and extending about a portion of said fitting to intersect itself adjacent said aperture, said way forming a bight about one marginal edge of said eye, said way being sufficiently deep adjacent its point of communication with said aperture that a portion of said cable adjacent its passage through said aperture is adapted to bind another portion thereof when said latter portion is positioned in said way under said first mentioned portion, and a pocket proportioned and arranged to house the end of said cable, said pocket extending transversely of the inner end of said eye, the end of said cable adjacent said pocket lying within said bight whereby the end of said cable may be passed through said aperture, looped about said fitting, and drawn tight thereon by power.

7. A fitting for a logging choker comprising a flat elongated integral member having an eye formed at one end and fastening means for securing the end of a cable at the other end thereof, said end carrying said eye terminating in a relatively sharp-edged rim portion constituting a digging edge.

8. A logging choker comprising a length of cable and a fitting secured to one end thereof comprising a flat elongated integral member having an eye formed at one end and fastening means for securing the end of said cable at the other end thereof, said end carrying said eye terminating in a relatively sharp-edged rim portion of wedge-shaped section constituting a digging edge.

WILLIAM A. MEIGHAN.